US012664728B2

(12) United States Patent
Alawieh et al.

(10) Patent No.: US 12,664,728 B2
(45) Date of Patent: Jun. 23, 2026

(54) METHOD FOR CREATING A REFERENCE MAP REPRESENTATION

(71) Applicant: Robert Bosch GmbH, Stuttgart (DE)

(72) Inventors: Ali Alawieh, Untergruppenbach (DE); Alexandru Paul Condurache, Renningen (DE); Tobias Strauss, Bad Wimpfen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 145 days.

(21) Appl. No.: 18/659,376

(22) Filed: May 9, 2024

(65) Prior Publication Data

US 2024/0386671 A1      Nov. 21, 2024

(30) Foreign Application Priority Data

May 17, 2023    (DE) ..................... 10 2023 204 603.2

(51) Int. Cl.
*G06T 17/05*        (2011.01)
*G01C 21/00*        (2006.01)
*G06N 3/045*        (2023.01)
*G06N 3/0455*       (2023.01)

(52) U.S. Cl.
CPC .......... *G06T 17/05* (2013.01); *G01C 21/3804* (2020.08); *G06N 3/045* (2023.01); *G06N 3/0455* (2023.01)

(58) Field of Classification Search
CPC .......... G06T 17/05; G06T 2207/10028; G06N 3/0455
See application file for complete search history.

(56) References Cited

U.S. PATENT DOCUMENTS

2021/0150228 A1      5/2021    Goforth et al.
2021/0286068 A1      9/2021    Kumar et al.
(Continued)

FOREIGN PATENT DOCUMENTS

DE        102016109298 A1      12/2016
DE        102019127283 A1       4/2021
EP            3929807 A1      12/2021

OTHER PUBLICATIONS

Xiao, Aoran, et al. "Unsupervised point cloud representation learning with deep neural networks: A survey." IEEE Transactions on Pattern Analysis and Machine Intelligence 45.9 (2023): 11321-11339. (Year: 2023).*

(Continued)

*Primary Examiner* — Ryan McCulley

(74) *Attorney, Agent, or Firm* — NORTON ROSE FULBRIGHT US LLP

(57)                 ABSTRACT

A method for creating a reference map representation using an artificial neural network, wherein the neural network comprises an encoder and a decoder. The method includes: receiving point cloud data representing a point cloud of the environment of the motor vehicle that was created on the basis of a detection of an environment of a motor vehicle by an environmental sensor of the motor vehicle; receiving state data representing a state of the environmental sensor during the detection of the environment by the environmental sensor; training the encoder and the decoder on the basis of the point cloud data and the state data.

15 Claims, 3 Drawing Sheets

(56) References Cited

U.S. PATENT DOCUMENTS

| | | | |
|---|---|---|---|
| 2023/0128484 A1* | 4/2023 | Turbiner ............... | G01S 13/933 |
| | | | 342/90 |
| 2023/0192141 A1* | 6/2023 | Zhang .................... | G06V 10/25 |
| 2024/0054682 A1* | 2/2024 | Bai ........................... | G06T 9/00 |

OTHER PUBLICATIONS

Zhao, Lili, et al. "Real-time scene-aware LiDAR point cloud compression using semantic prior representation." IEEE Transactions on Circuits and Systems for Video Technology 32.8 (2022): 5623-5637. (Year: 2022).*
Suo, et al.: "LPD-AE: Latent Space Representation of Large-Scale 3D Point Cloud," IEEE Access, 8 (2020), pp. 108402-108417, 10.1109/ACCESS.2020.2999727.
Wiesmann, et al.: "Deep Compression for Dense Point Cloud Maps," IEEE Robotics and Automation Letters, 6(2), (2021). pp. 2060-2067, 10.1109/LRA.2021 .3059633.

* cited by examiner receive point cloud data — 101 receive state data — 103 train encoder and decoder

107 create reference map

— 105

109 reconstruct point cloud

111 predetermined training end criterion fulfilled?

output trained encoder, trained decoder, and reference map representation — 113 receive point cloud data — 201 query decoder — 203 create further point cloud representation — 205 localize motor vehicle — 207 define trajectory ～301 define state curve ～303 create point cloud ～305 apparatus configured to perform method ～401

501 machine-readable storage medium computer program

503

METHOD FOR CREATING A REFERENCE MAP REPRESENTATION

CROSS REFERENCE

The present application claims the benefit under 35 U.S.C. § 119 of German Patent Application No. DE 10 2023 204 603.2 filed on May 17, 2023, which is expressly incorporated herein by reference in its entirety.

FIELD

The present invention relates to a method for creating a reference map representation, to a method for localizing a motor vehicle, to a method for simulating a point cloud, to an apparatus, to a computer program, and to a machine-readable storage medium.

BACKGROUND INFORMATION

German Patent Application No. DE 10 2016 109 298 A1 describes a fusion method for a cross-traffic application using radar devices and a camera.

German Patent Application No. DE 10 2019 127 283 A1 describes a system and a method for detecting an object in a three-dimensional environment of a carrier vehicle.

European Patent Application No. EP 3 929 807 A1 describes a system and a method for a sensor fusion system.

SUMMARY

An object of the present invention is to provide a method for creating a reference map representation.

An object of the present invention is also to provide a method for localizing a motor vehicle.

An object of the present invention is also to provide a method for simulating a point cloud.

An object of the present invention is also to provide an apparatus.

An object of the present invention is also to provide a computer program.

An object of the present invention is also to provide a machine-readable storage medium.

These objects may be achieved by means of features of the present invention disclosed herein. Advantageous configurations of the present invention are disclosed herein.

According to a first aspect of the present invention, a method for creating a reference map representation using an artificial neural network is provided, wherein the neural network comprises an encoder and a decoder. According to an example embodiment of the present invention, the method comprises the following steps:

receiving point cloud data representing a point cloud of the environment of the motor vehicle that was created on the basis of a detection of an environment of a motor vehicle by an environmental sensor of the motor vehicle, receiving state data representing a state of the environmental sensor during the detection of the environment by the environmental sensor, training the encoder and the decoder on the basis of the point cloud data and the state data, wherein the training includes the following steps:

creating, by the encoder, a reference map representation of the environment of the motor vehicle on the basis of the point cloud data and the state data, reconstructing, by the decoder, the point cloud on the basis of the reference map representation created by the encoder and on the basis of the state data, and without using the point cloud data, in order to create a reconstructed point cloud, wherein the encoder and the decoder are trained until a predetermined training end criterion is fulfilled, in order to obtain a trained encoder and a trained decoder and a reference map representation created by the trained encoder.

According to a second aspect of the present invention, a method for localizing a motor vehicle using the decoder trained according to the method according to the first aspect and the reference map representation created according to the method according to the first aspect and representing the environment of the motor vehicle is provided. According to an example embodiment of the present invention, the method includes the following steps:

receiving point cloud data representing a point cloud of the environment of the motor vehicle that was created on the basis of a detection of an environment of the motor vehicle by an environmental sensor of the motor vehicle, querying the decoder with a query state of the environmental sensor using the reference map representation in order to create, by the decoder, a further point cloud representing a point cloud of the environment of the motor vehicle that was created on the basis of a detection of the environment of the motor vehicle by the environmental sensor of the motor vehicle, if a state of the environmental sensor during the detection is the query state, localizing the motor vehicle on the basis of the point cloud and the further point cloud.

According to a third aspect of the present invention, a method for simulating a point cloud using the decoder trained according to the method according to the first aspect of the present invention and the reference map representation created according to the method according to the first aspect is provided.

According to an example embodiment of the present invention, the method includes the following steps:

defining a trajectory of a simulated motor vehicle through the environment which the reference map representation represents, defining a state curve of a simulated state of an environmental sensor of the motor vehicle during a simulated drive along the trajectory by the motor vehicle, creating, by the decoder, a point cloud on the basis of the state data in order to simulate a point cloud created on the basis of a detection of an environment of the motor vehicle by the environmental sensor during a simulated trip of the motor vehicle along the trajectory.

According to a fourth aspect of the present invention, an apparatus is provided, which is configured to perform all steps of the method according to the first aspect of the present invention and/or according to the second aspect of the present invention and/or according to the third aspect of the present invention.

According to a fifth aspect of the present invention, a computer program is provided, which comprises commands that, when the computer program is executed by a computer, for example by the apparatus according to the fourth aspect of the present invention, cause the computer to perform a method according to the first aspect of the present invention and/or according to the second aspect of the present invention and/or according to the third aspect of the present invention.

According to a sixth aspect of the present invention, a machine-readable storage medium is provided, on which the computer program according to the fifth aspect of the present invention is stored.

For example, the apparatus comprises one or more processor devices, which can, for example, each comprise one or more processors, wherein the one or more processor devices each perform one or more, in particular different, steps of the computer program.

The present invention is based on and includes the knowledge that the respective object above may be achieved in that the reference map representation is created using an artificial neural network, wherein the neural network comprises an encoder and a decoder. The encoder and the decoder are trained on the basis of training data until a predetermined training end criterion is fulfilled. The training data comprise the point cloud data and the state data. Within the framework of the training, the point cloud is reconstructed by the decoder. This takes place solely on the basis of the reference map representation created by the encoder and on the basis of the state data, i.e., without using the point cloud data. This means that the decoder does not use the point cloud data to reconstruct the point cloud.

As a result of the training, a trained decoder, a trained encoder, and a reference map representation created by the trained encoder are thus obtained.

The correspondingly trained decoder and the correspondingly created reference map representation can subsequently be used in a more efficient manner for further applications. Two exemplary applications are defined according to the method according to the second aspect and according to the third aspect: a localization of a motor vehicle and a simulation of a point cloud.

Through the use of the artificial neural network, a reference map representation can thus be efficiently created, which can subsequently be used in an advantageous manner for further meaningful applications.

The trained encoder can advantageously be used to create, for a different environment, a different reference map representation for this different environment. The use cases described here can be extended or applied to a different environment, by way of example.

This means, for example, that a reference map representation for a first city can be created according to the concept described here. The trained encoder can subsequently create a different reference map representation for a second city that is different from the first city. By training the encoder and the decoder once for different environments, i.e., for example, for different cities, corresponding reference map representations can thus be created and subsequently used in a more efficient manner.

A reference map representation comprises or is, for example, a reference point cloud.

In one example embodiment of the method according to the first aspect of the present invention, it is provided that the state of the environmental sensor comprises a pose and a velocity.

This, for example, brings about the technical advantage that the state indicates particularly meaningful information. The pose and velocity of the environmental sensor can be used in an efficient manner to enrich or expand the points of the point cloud with meaningful information, as described below.

In one embodiment of the method according to the second aspect of the present invention, a Kalman filter is used. For example, on the basis of a previous state estimate of the Kalman filter, it is predicted how the current state of the environmental sensor. The query state is thus, for example, the state predicted using the Kalman filter. For example, an algorithm for registering point clouds is used to correct the predicted state on the basis of the further point cloud, wherein the motor vehicle is localized on the basis of the corrected predicted state.

In one embodiment of the method according to the second aspect of the present invention, a brute-force localization algorithm can be used, in which the encoder is queried with a plurality of possible states, in particular all possible states, in a particular space and in which the state is selected for which the further point cloud best matches the point cloud of the environment of the motor vehicle that was created on the basis of a detection of the environment of the motor vehicle by the environmental sensor of the motor vehicle, wherein the motor vehicle is localized on the basis of the selected state.

In one embodiment of the method according to the first aspect of the present invention, it is provided that, on the basis of the state data, the points of the point cloud are respectively expanded by a relative position, an orientation, and a velocity relative to the environmental sensor in order to obtain a state-enhanced point cloud whose points respectively contain the corresponding relative position, the corresponding orientation, and the corresponding velocity relative to the environmental sensor, wherein the encoder and the decoder are trained on the basis of the state-enhanced point cloud so that the reference map representation is created by the encoder on the basis of the state-enhanced point cloud.

This, for example, brings about the technical advantage that the reference map representation can be created efficiently. This means that, according to this embodiment, it is in particular provided to enrich the points of the point cloud with further information, i.e., to expand them. In English, the term "to augment" is used for this enrichment or expansion. On the basis of such an enriched point cloud, the encoder can then efficiently create the reference map representation. The state-enhanced point cloud can also be referred to as an enriched point cloud.

Augmenting the reference map representation with information about the environmental sensor state is very advantageous. This is because the point cloud measured by the environmental sensor can vary greatly when the environmental sensor state changes, e.g., when the viewing angle of the environmental sensor with respect to the environment is different, or when the velocity is different, or when the distance is different. It is thus advantageous to feed in information about the environmental sensor state in order to create map features that capture the dependence on the viewing angle.

In one embodiment of the method according to the first aspect of the present invention, it is provided that, prior to the training, points assigned to a mobile object are filtered out of that point cloud on the basis of which the encoder is to create the reference map representation, in order to obtain a filtered point cloud whose points are respectively only assigned to a static object, wherein the encoder creates the reference map representation on the basis of the filtered point cloud.

This, for example, brings about the technical advantage that the reference map representation can be created efficiently. According to this embodiment, it is thus provided that the mobile objects are filtered out of the point cloud on the basis of which the encoder is to create the reference map representation. Since mobile objects can change from one trip of the motor vehicle to the next, it is advantageous not to use them for creating the reference point cloud. The static objects have a much higher relevance to this purpose.

The phrase "that point cloud" refers, for example, to the point cloud. It can, for example, also refer to the state-enhanced point cloud.

In one embodiment of the method according to the first aspect of the present invention, it is provided that the encoder creates the reference map representation such that the points thereof contain one or more features, from which only one or more particular features are selected on the basis of the state data in order to obtain a reference map representation of selected features whose points only contain the selected features, wherein the decoder reconstructs the point cloud on the basis of the reference map representation of selected features.

This, for example, brings about the technical advantage that the reference map representation can be created efficiently. This, for example, brings about the technical advantage that the point cloud can be reconstructed efficiently.

Apart from the efficiency, the selection can also be helpful in the training phase since it functions as a regularization and forces the optimizer to update only the relevant model parameters for the individual input data, which in turn can help improve the accuracy and generalizability of the learned model.

In one embodiment of the method according to the first aspect of the present invention, it is provided that a subregion of the reference map representation is selected on the basis of the state data and/or on the basis of a field of view of the environmental sensor, wherein the decoder reconstructs the point cloud on the basis of the selected subregion. Such a subregion is also referred to in English as the "region of interest," in German: "Region von Interesse" or "Bereich von Interesse."

This, for example, brings about the technical advantage that the point cloud can be reconstructed efficiently.

Apart from the efficiency, the selection can also be helpful in the training phase since it functions as a regularization and forces the optimizer to update only the relevant model parameters for the individual input data, which in turn can help improve the accuracy and generalizability of the learned model.

In one embodiment of the method according to the first aspect of the present invention, it is provided that the predetermined training end criterion indicates that, in order to be fulfilled, a chamfer distance between reconstructed point cloud and point cloud must be less than, or less than or equal to, a predetermined threshold value.

This, for example, brings about the technical advantage that it is possible to efficiently determine when the training end criterion is fulfilled so that it can be efficiently defined when the training is to be completed.

In one embodiment of the method according to the first aspect of the present invention, it is provided that the encoder is a DGCNN and the decoder is a transformer network.

This, for example, brings about the technical advantage that a particularly suitable encoder or a particularly suitable decoder is used.

The abbreviation "DGCNN" stands for "dynamic graph convolutional neural network."

In one embodiment of the method according to the second aspect of the present invention, it is provided that the points of the reference map representation contain one or more features, from which only one or more particular features are selected on the basis of the state data in order to obtain a reference map representation of selected features whose points only contain the selected features, wherein the decoder creates the further point cloud on the basis of the reference map representation of selected features.

This, for example, brings about the technical advantage that the further point cloud can be created efficiently.

In one embodiment of the method according to the second aspect of the present invention, it is provided that a subregion of the reference map representation is selected, wherein the decoder creates the further point cloud on the basis of the selected subregion. Such a subregion is also referred to in English as the "region of interest," in German: "Region von Interesse" or "Bereich von Interesse."

In one embodiment of the method according to the first aspect of the present invention, the method is a computer-implemented method.

In one embodiment of the method according to the second aspect of the present invention, the method is a computer-implemented method.

In one embodiment of the method according to the third aspect of the present invention, the method is a computer-implemented method.

The apparatus according to the fourth aspect of the present invention is, for example, configured programmatically to execute the computer program according to the fifth aspect of the present invention.

Statements made in connection with the method according to the first aspect apply analogously to the method according to the second aspect and/or to the method according to the third aspect, and vice versa.

Technical features and technical functionalities of the method according to the first aspect of the present invention result analogously from corresponding technical functionalities and technical features of the method according to the second aspect of the present invention and/or of the method according to the third aspect of the present invention, and vice versa.

The embodiments and exemplary embodiments described here can be combined with one another in any way even if this is not explicitly described.

The step of detecting the environment of the motor vehicle by the environmental sensor of the motor vehicle is, for example, explicitly comprised by the method according to the first aspect and/or by the method according to the second aspect of the present invention.

An environmental sensor within the meaning of the description is, for example, one of the following environmental sensors: radar sensor, LiDAR sensor, and ultrasonic sensor.

The point cloud is thus, for example, a radar point cloud or a LiDAR point cloud or an ultrasonic point cloud.

The present invention is explained in more detail below using preferred exemplary embodiments.

DETAILED DESCRIPTION OF EXAMPLE EMBODIMENTS

Figure 1:
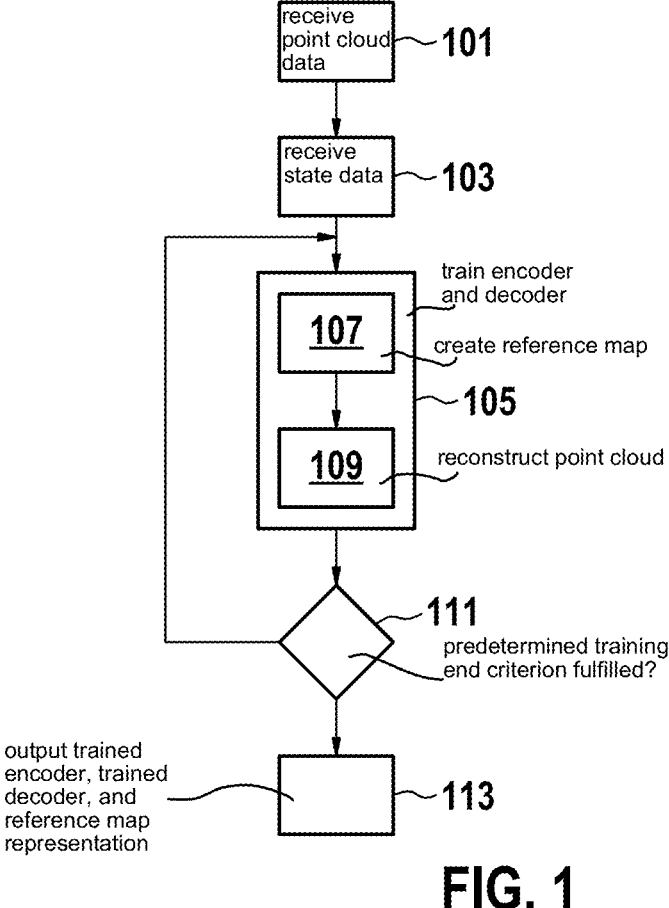
FIG. 1 shows a flowchart of a method according to the first aspect of the present invention.

FIG. 1 shows a flowchart of a method for creating a reference map representation using an artificial neural network, wherein the neural network comprises an encoder and a decoder, comprising the following steps:

receiving 101 point cloud data representing a point cloud of the environment of the motor vehicle that was created on the basis of a detection of an environment of a motor vehicle by an environmental sensor of the motor vehicle, receiving 103 state data representing a state of the environmental sensor during the detection of the environment by the environmental sensor, training 105 the encoder and the decoder on the basis of the point cloud data and the state data, wherein the training comprises the following steps:

creating 107, by the encoder, a reference map representation of the environment of the motor vehicle on the basis of the point cloud data and the state data, reconstructing 109, by the decoder, the point cloud on the basis of the reference map representation created by the encoder and on the basis of the state data, and without using the point cloud data, in order to create a reconstructed point cloud, wherein the encoder and the decoder are trained 105 until a predetermined training end criterion is fulfilled, in order to obtain a trained encoder and a trained decoder and a reference map representation created by the trained encoder.

This means that, after a training step, it is checked in a step 111 whether the predetermined training end criterion is fulfilled. If this is not the case, the training is continued. If the predetermined training end criterion is fulfilled, the trained encoder, the trained decoder, and the reference map representation created by the trained encoder are output in a step 113.

For example, a plurality of predetermined training end criteria is provided, which must be fulfilled for the training to be considered ended, i.e., so that the training is ended.

A state within the meaning of the description comprises, for example, a pose and a velocity or velocity vector. A pose indicates a position and an orientation.

State data within the meaning of the description comprise, for example, a state of the motor vehicle during the detection of the environment of the motor vehicle by the environmental sensor. The state of the motor vehicle comprises, for example, a pose and a velocity or velocity vector. The pose of the motor vehicle indicates, for example, a position and an orientation.

If the term "velocity" is used, the term "velocity vector" is always implied. That is to say, in particular, that a state within the meaning of the description comprises, for example, a pose and a velocity vector.

Figure 2:
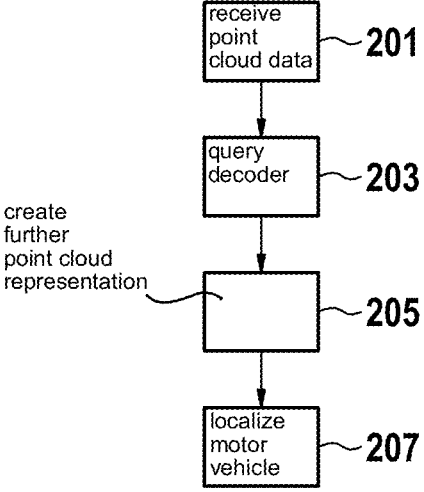
FIG. 2 shows a flowchart of a method according to the second aspect of the present invention.

FIG. 2 shows a flowchart of a method for localizing a motor vehicle using the decoder trained according to the first aspect and the reference map representation created according to the first aspect and representing the environment of the motor vehicle, comprising the following steps:

receiving 201 point cloud data representing a point cloud of the environment of the motor vehicle that was created on the basis of a detection of an environment of the motor vehicle by an environmental sensor of the motor vehicle, querying 203 the decoder with a query state of the environmental sensor using the reference map representation in order to create 205, by the decoder, a further point cloud representing a point cloud of the environment of the motor vehicle that was created on the basis of a detection of the environment of the motor vehicle by the environmental sensor of the motor vehicle, if a state of the environmental sensor during the detection is the query state, localizing 207 the motor vehicle on the basis of the point cloud and the further point cloud.

Figure 3:
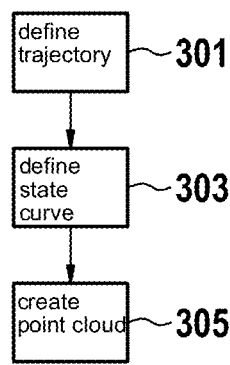
FIG. 3 shows a flowchart of a method according to the third aspect of the present invention.

FIG. 3 shows a flowchart of a method for simulating a point cloud using the decoder trained according to the first aspect and the reference map representation created according to the first aspect, comprising the following steps:

defining 301 a trajectory of a simulated motor vehicle through the environment which the reference map representation represents, defining 303 a state curve of a simulated state of an environmental sensor of the motor vehicle during a simulated drive along the trajectory by the motor vehicle, creating 305, by the decoder, a point cloud on the basis of the state data in order to simulate a point cloud created on the basis of a detection of an environment of the motor vehicle by the environmental sensor during a simulated trip of the motor vehicle along the trajectory.

Figure 4:
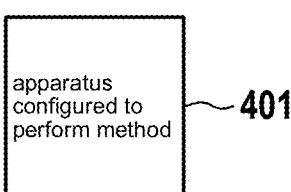
FIG. 4 shows an apparatus, according to an example embodiment of the present invention.

FIG. 4 shows an apparatus 401, which is configured to perform all steps of the method according to the first aspect and/or according to the second aspect and/or according to the third aspect.

Figure 5:
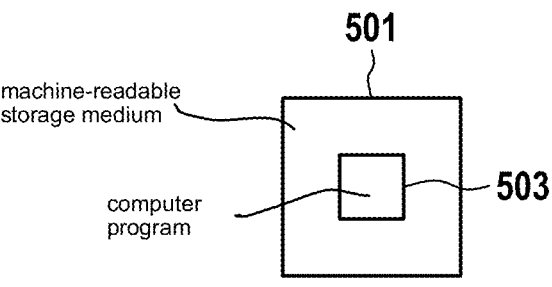
FIG. 5 shows a machine-readable storage medium, according to an example embodiment of the present invention.

FIG. 5 shows a machine-readable storage medium 501 on which a computer program 503 is stored. The computer program 503 comprises commands that, when the computer program 503 is executed by a computer, cause the computer to perform a method according to the first aspect and/or according to the second aspect and/or according to the third aspect.

Figure 6:
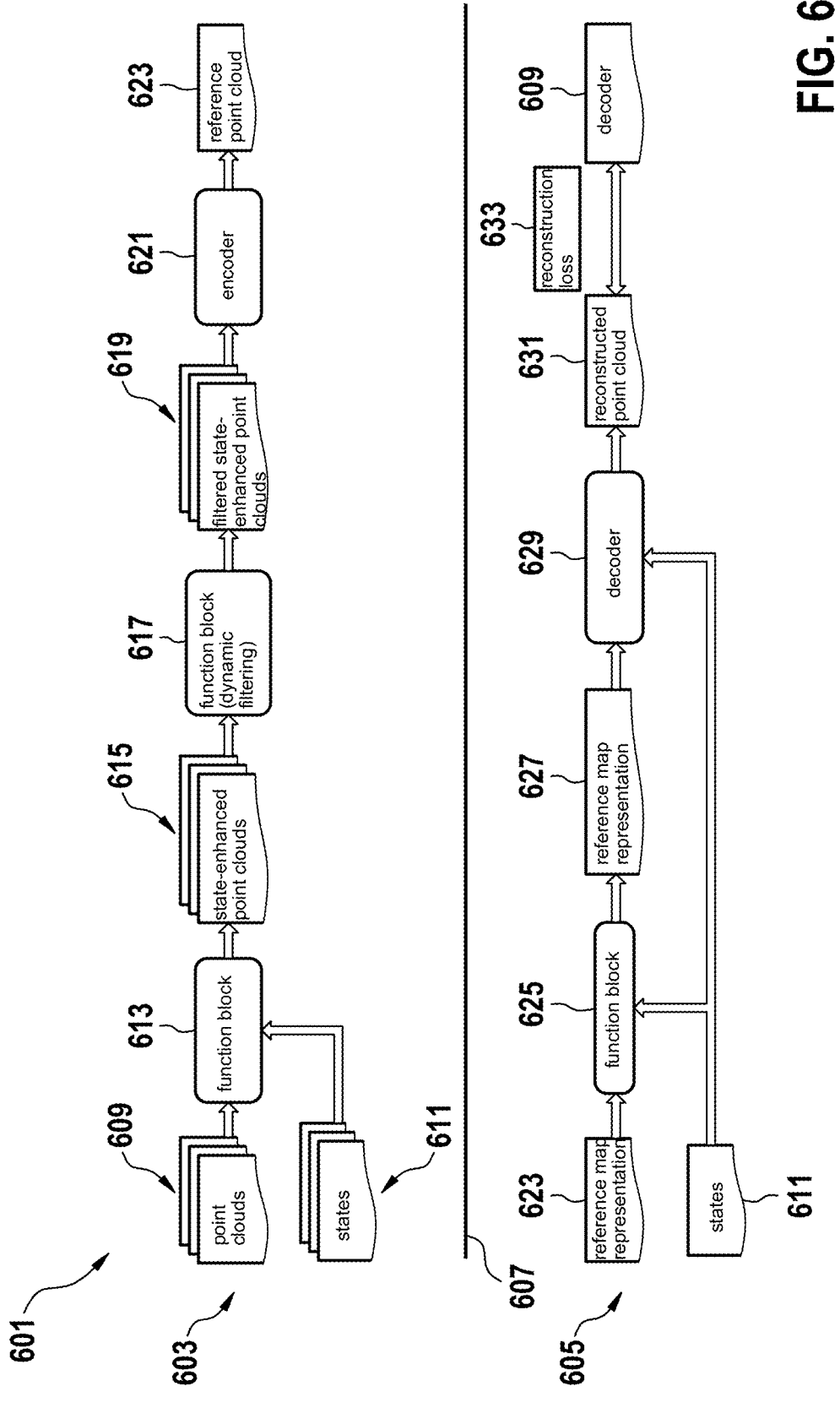
FIG. 6 shows a block diagram, according to an example embodiment of the present invention.

FIG. 6 shows a block diagram 601 which is to explain the here described concept by way of example.

The block diagram 601 is divided into a top portion 603 and a bottom portion 605, which are separated by a line with reference sign 607. The top portion 603 relates to the encoder and the bottom portion 605 relates to the decoder.

After training the encoder and the decoder, only the bottom portion 605 is needed in the application. This is explained in more detail below.

A plurality of point clouds 609 is used, which were, for example, created by a plurality of motor vehicles during a plurality of trips by detecting the respective environment by an environmental sensor of the motor vehicle. These point clouds are, for example, radar point clouds. This means that, for example, a plurality of motor vehicles using a respective environmental sensor detect a common environment during the corresponding trips of the motor vehicles so that a plurality of radar point clouds, in general point clouds, are created and are used for the training according to the concept described here.

For example, it can be provided that a motor vehicle drives through a particular area one or more times so that the same environment is detected one or more times by the environmental sensor of the motor vehicle. In this way, too, a plurality of point clouds can be created, which can be used according to the concept described here to train the encoder and the decoder.

At this point, it is noted that the concept described here can also be expanded to a plurality of point clouds and a plurality of states and a plurality of motor vehicles.

Furthermore, it is provided to use the respective state of the respective environmental sensor during the detection of the environment. Accordingly, a plurality of states 611 is available to train the encoder and the decoder. In addition to the respective state 611 of the respective environmental sensor, the states of the motor vehicles can optionally also be used for the training.

The respective state 611 of the motor vehicles is, for example, measured by suitable sensors, which is conventional to the person skilled in the art.

For the training of the encoder and the decoder, a plurality of point clouds 609 and a plurality of states 611 of the environmental sensors during the detection are thus available; in particular, the states of the motor vehicles during the detection of the respective environment are optionally additionally also available.

The point clouds 609 are expanded by the respective states 611 according to a function block 613. A plurality of state-enhanced point clouds 615 is thus obtained. This plurality of state-enhanced point clouds 615 is dynamically filtered according to a function block 617 (dynamics filtering). This means that the mobile objects are filtered out of the state-enhanced point clouds 615.

Subsequently, i.e., after the filtering, a plurality of filtered state-enhanced point clouds 619 are available, which an encoder 621 uses to create a reference map representation 623. In particular, the reference point cloud 623 contains, for each point, a feature vector, which represents a plurality of features. This means that one or more features can be assigned to the points of the created reference map representation 623.

According to the bottom portion 605 of the block diagram 601, the created reference map representation 623 is used for the training of the decoder 629. Specifically, a state 611 that has already been used for the top portion 603 is used to select, on the basis thereof, one or more particular features from the features of the reference map representation 623. This takes place according to a function block 625. Subsequently, a reference map representation 627 of selected features within the meaning of the description is obtained. This reference map representation 627 of selected features uses the decoder 629 to reconstruct the point cloud 611 associated with the corresponding state 611. For this purpose, the decoder 629 uses the state 611 and the reference map representation 627 of selected features. For reconstructing, the decoder 629 does not use the original point cloud 609.

The decoder 629 thus creates a reconstructed point cloud 631. This reconstructed point cloud is compared to the point cloud 609 within the framework of the training in order to determine a reconstruction loss 633. The reconstruction loss 633 can, for example, be represented by a chamfer distance. If the reconstruction loss 633 is small enough, the training is ended, for example. Otherwise, encoder 621 and decoder 629 are further trained until the reconstruction loss 633 is acceptable, i.e., for example, the chamfer distance is less than, or less than or equal to, a predetermined threshold value.

Subsequently, a trained encoder 621 and a trained decoder 629 as well as a reference map representation 623 are thus available, which can be further used according to the concept described here.

For example, an enrichment of the input point cloud information (radar point cloud) with information about the visual state, i.e., the relative position, orientation, and velocity, between each measured point and the radar sensor is carried out in order to obtain a state-enhanced point cloud.

For example, filtering of radar points corresponding to dynamic objects is carried out, for example on the basis of the ego-compensated radial velocity ("ego" stands for the motor vehicle), wherein the radial velocity is ascertained by the radar sensor using the Doppler effect.

For a particular state, for example pose and velocity of the environmental sensor or optionally of the motor vehicle, the point cloud is reconstructed using the decoder.

In other words, based solely on the reference map representation and the state, the decoder creates a further point cloud, which should ideally correspond to the original point cloud, although there is generally some loss in a real case.

During the training, a set of measured point clouds are fed together with the corresponding motor vehicle states and environmental sensor states into the first stage (top portion 603 of the block diagram 601) in order to create a reference map representation, which in particular captures the dependencies between the visual states.

This reference map representation is then fed together with a motor vehicle state and environmental sensor state used to create the reference map representation, into the second stage (bottom portion 605 of the block diagram 601) in order to reconstruct the point cloud or to generate a predicted radar measurement for these states. A reconstruction loss (e.g., chamfer distance) can then be used to optimize the trainable parameters of the encoder and of the decoder.

As soon as the trainable components are optimized for a particular data set, a reference map representation of any environment can be created when a set of measurements from this environment is present with known states of the environmental sensor and, in particular, optionally of the motor vehicle. And as soon as the reference map representation is created, it can be used to generate or create predicted measurements from each queried state that is within the environment represented by the reference map representation.

An improved localization can thus, for example, be brought about as follows: After the creation of the reference map representation that captures information about the visual state, the reference map representation can be queried for expected radar measurements in any environmental sensor state, and the localization can therefore be formulated as a point cloud registration problem between expected and actual radar measurements.

Solving this point cloud registration problem is much more robust and accurate than localization on the basis of conventional radar maps that contain agnostically accumulated data from all visual states, since the algorithm can focus on the relevant data from the reference map representation and is not distracted by other irrelevant data or is trying to assign things that look very different.

The reference map representation can advantageously be used to determine which lane the motor vehicle is currently in, which can be considered to be a rough localization. That is to say, for example, it is possible to define a classifier that is based on comparing the actual measurements to the expected measurements for each lane.

Furthermore, radar data can be simulated: With the most recent advances toward autonomous driving, the need for vast amounts of data for training AI algorithms and validating the implemented algorithms and functions is increasing. The simulation is one of the relatively cost-effective methods that can be used for this purpose, since it reduces the necessary amount of real data (and the associated costs) and can generally be adjusted such that rare events or desired use cases can be simulated.

The proposed reference map representation is particularly suitable for this purpose, as opposed to other methods relying on complex radar sensor simulations (on the basis of physics or machine learning) and detailed 3D environmental models with known material properties, which requires significant modeling effort and has only limited fidelity and closeness to reality.

Using the reference map representation, the decoder can generate synthetic data (point clouds) from many simulated trips, for example by defining the trajectories (including the velocities) of the motor vehicle and the states in the environment and being able to query the reference map representation for radar measurements along these trajectories. In this way, vast amounts of data can be generated, which make virtual training/testing/validation possible for many use cases (e.g., lane change, acceleration, and braking . . . ).

The simulation can be used for measurements in the static world. The simulation can be expanded by modeling occluding effects of dynamic objects in the scene by not returning any radar points for beams occluded by these objects.

What is claimed is:

1. A method for localizing a motor vehicle using a trained decoder and a created reference map representation which represents an environment of the motor vehicle, the reference map representation being created using an artificial neural network, wherein the neural network includes an encoder and the decoder, the creating of the reference map representation and the training of the decoding includes the following steps:

receiving point cloud data representing a point cloud of the environment of the motor vehicle that was created based on a detection of the environment of the motor vehicle by an environmental sensor of the motor vehicle, receiving state data representing a state of the environmental sensor during the detection of the environment by the environmental sensor, and training the encoder and the decoder based on the point cloud data and the state data, wherein the training includes the following steps:

creating, by the encoder, a reference map representation of the environment of the motor vehicle based on the point cloud data and the state data, reconstructing, by the decoder, the point cloud based on the reference map representation created by the encoder and based on the state data, and without using the point cloud data, in order to create a reconstructed point cloud;

wherein the encoder and the decoder are trained until a predetermined training end criterion is fulfilled, in order to obtain a trained encoder and a trained decoder and the reference map representation created by the trained encoder;

wherein the method localizing the motor vehicle comprises the following steps:

receiving the point cloud data representing the point cloud of the environment of the motor vehicle that was created based on the detection of the environment of the motor vehicle by the environmental sensor of the motor vehicle, querying the decoder with a query state of the environmental sensor using the reference map representation in order to create, by the decoder, a further point cloud representing a point cloud of the environment of the motor vehicle that was created based on a detection of the environment of the motor vehicle by the environmental sensor of the motor vehicle, when a state of the environmental sensor during the detection is the query state, and localizing the motor vehicle based on the point cloud and the further point cloud.

2. The method according to claim 1, wherein the state of the environmental sensor includes a pose and a velocity.

3. The method according to claim 1, wherein, based on the state data, the points of the point cloud are respectively expanded by a relative position, an orientation, and a velocity relative to the environmental sensor, in order to obtain a state-enhanced point cloud whose points respectively contain a corresponding relative position, a corresponding orientation, and a corresponding velocity relative to the environmental sensor, wherein the encoder and the decoder are trained based on the state-enhanced point cloud so that the reference map representation is created by the encoder based on the state-enhanced point cloud.

4. The method according to claim 1, wherein, prior to the training, points assigned to a mobile object are filtered from the point cloud based on which the encoder is to create the reference map representation, in order to obtain a filtered point cloud whose points are respectively only assigned to a static object, wherein the encoder creates the reference map representation based on the filtered point cloud.

5. The method according to claim 1, wherein the encoder creates the reference map representation such that points of the reference map representation contain one or more features, from which only one or more particular features are selected based on the state data in order to obtain a reference map representation of selected features whose points only contain the selected features, wherein the decoder reconstructs the point cloud based on the reference map representation of selected features.

6. The method according to claim 1, wherein the predetermined training end criterion indicates that, in order to be fulfilled, a chamfer distance between reconstructed point cloud and point cloud must be less than, or less than or equal to, a predetermined threshold value.

7. The method according to claim 1, wherein the encoder is a DGCNN and/or the decoder is a transformer network.

8. The method according to claim 1, wherein points of the reference map representation contain one or more features, from which only one or more particular features are selected based on the state data in order to obtain a reference map representation of selected features whose points only contain the selected features, wherein the decoder creates the further point cloud based on the reference map representation of selected features.

9. A method for simulating a point cloud using a trained decoder and a created reference map representation, the decoder being trained and the reference map representation being created using an artificial neural network, wherein the neural network includes an encoder and the decoder, the reference map being created by:

receiving point cloud data representing a point cloud of an environment of a motor vehicle that was created based on a detection of the environment of the motor vehicle by an environmental sensor of the motor vehicle;

receiving state data representing a state of the environmental sensor during the detection of the environment by the environmental sensor; and training the encoder and the decoder based on the point cloud data and the state data, wherein the training includes the following steps:

creating, by the encoder, a reference map representation of the environment of the motor vehicle based on the point cloud data and the state data, reconstructing, by the decoder, the point cloud based on the reference map representation created by the encoder and based on the state data, and without using the point cloud data, in order to create a reconstructed point cloud;

wherein the encoder and the decoder are trained until a predetermined training end criterion is fulfilled, in order to obtain a trained encoder and a trained decoder and a reference map representation created by the trained encoder;

wherein the method for simulating the point cloud comprises the following steps:

defining a trajectory of a simulated motor vehicle through the environment which the reference map representation represents;

defining a state curve of a simulated state of an environmental sensor of the simulated motor vehicle during a simulated drive along the trajectory by the simulated motor vehicle; and creating, by the decoder, a point cloud based on the state curve in order to simulate a point cloud created based on a detection of an environment of the simulated motor vehicle by the environmental sensor during a simulated trip of the simulated motor vehicle along the trajectory.

10. The method according to claim 9, wherein the state of the environmental sensor includes a pose and a velocity.

11. The method according to claim 9, wherein, based on the state data, the points of the point cloud are respectively expanded by a relative position, an orientation, and a velocity relative to the environmental sensor, in order to obtain a state-enhanced point cloud whose points respectively contain a corresponding relative position, a corresponding orientation, and a corresponding velocity relative to the environmental sensor, wherein the encoder and the decoder are trained based on the state-enhanced point cloud so that the reference map representation is created by the encoder based on the state-enhanced point cloud.

12. The method according to claim 9, wherein, prior to the training, points assigned to a mobile object are filtered from the point cloud based on which the encoder is to create the reference map representation, in order to obtain a filtered point cloud whose points are respectively only assigned to a static object, wherein the encoder creates the reference map representation based on the filtered point cloud.

13. The method according to claim 9, wherein the encoder creates the reference map representation such that points of the reference map representation contain one or more features, from which only one or more particular features are selected based on the state data in order to obtain a reference map representation of selected features whose points only contain the selected features, wherein the decoder reconstructs the point cloud based on the reference map representation of selected features.

14. The method according to claim 9, wherein the predetermined training end criterion indicates that, in order to be fulfilled, a chamfer distance between reconstructed point cloud and point cloud must be less than, or less than or equal to, a predetermined threshold value.

15. The method according to claim 9, wherein the encoder is a DGCNN and/or the decoder is a transformer network.

\* \* \* \* \*